(12) United States Patent
Lovell et al.

(10) Patent No.: US 11,470,093 B1
(45) Date of Patent: Oct. 11, 2022

(54) USER AUTHENTICATION AND DATA ENCRYPTION SYSTEMS AND METHODS

(71) Applicant: Elatum, LLC, Houston, TX (US)

(72) Inventors: David Lovell, Houston, TX (US); Alex P. Williams, Houston, TX (US); Ricardo Small, Katy, TX (US); Stephen D. Saenz, Houston, TX (US)

(73) Assignee: Elatum, LLC, Houston, TX (US)

(*) Notice: Subject to any disclaimer, the term of this patent is extended or adjusted under 35 U.S.C. 154(b) by 0 days.

(21) Appl. No.: 17/647,506

(22) Filed: Jan. 10, 2022

(51) Int. Cl.
| | | |
|---|---|---|
| H04L 29/06 | (2006.01) | |
| H04L 9/40 | (2022.01) | |
| H04L 9/06 | (2006.01) | |
| H04L 9/08 | (2006.01) | |
| H04L 9/00 | (2022.01) | |

(52) U.S. Cl.
CPC .......... H04L 63/123 (2013.01); H04L 9/0631 (2013.01); H04L 9/0861 (2013.01); H04L 9/50 (2022.05)

(58) Field of Classification Search
None
See application file for complete search history.

(56) References Cited

U.S. PATENT DOCUMENTS

| | | | | |
|---|---|---|---|---|
| 10,129,211 | B2 * | 11/2018 | Heath | G06Q 30/02 |
| 2007/0106754 | A1 * | 5/2007 | Moore | G16H 40/20 |
| | | | | 707/E17.116 |
| 2013/0104251 | A1 * | 4/2013 | Moore | G06F 21/602 |
| | | | | 726/30 |
| 2014/0074719 | A1 * | 3/2014 | Gressel | G06Q 30/06 |
| | | | | 713/168 |
| 2016/0004820 | A1 * | 1/2016 | Moore | G16H 15/00 |
| | | | | 705/3 |
| 2017/0076043 | A1 * | 3/2017 | Dormer | G16H 40/67 |
| 2019/0236594 | A1 | 8/2019 | Ehrlich-Quinn | |
| 2020/0204372 | A1 | 6/2020 | Ngo et al. | |

(Continued)

OTHER PUBLICATIONS

Le-Tien et al. Modified CNN model-based Forgery Detection applied to Multiple-Resolution Tampered Images. 2021 8th NAFOSTED Conference on Information and Computer Science (NICS). https://ieeexplore.ieee.org/stamp/stamp.jsp?tp=&arnumber=9701560 (Year: 2021).*

(Continued)

*Primary Examiner* — Jeremiah L Avery
(74) *Attorney, Agent, or Firm* — Husch Blackwell LLP

(57) ABSTRACT

Systems and methods for authenticating a request to initiate an electronic transaction and systems and encrypting data relating to executed electronic transactions are provided. Such systems and methods include receiving an electronic request signal, retrieving verified data associated with a user account, extracting verification data, and comparing the verification data against the verified data to determine whether the electronic request signal is authentic or fraudulent. Furthermore, when the electronic request signal is determined as authentic, such systems and methods include executing the secured electronic transaction, converting a digital image into a digital text string, cryptographically hashing the digital text string to output a secret key, digitally encrypting transaction data using the secret key, and registering the transaction data as encrypted with one or more databases.

20 Claims, 5 Drawing Sheets

(56) References Cited

U.S. PATENT DOCUMENTS

2021/0004454 A1    1/2021   Chester et al.
2021/0192651 A1*   6/2021   Groth .................. G06F 21/6263

OTHER PUBLICATIONS

Vinothini, K. et al. Dual Watermarking in Tele-radiology using DWT for Data Authentication and Security. 2019 International Conference on Communication and Signal Processing (ICCSP). https://ieeexplore.ieee.org/stamp/stamp.jsp?tp=&arnumber=8697935 (Year: 2019).*
International Search Report and Written Opinion dated Jun. 13, 2022, issued in corresponding WIPO application.

* cited by examiner

USER AUTHENTICATION AND DATA ENCRYPTION SYSTEMS AND METHODS

FIELD OF INVENTION

The invention relates to electronic transactions. In particular, the invention relates to systems and methods for authenticating a request to initiate an electronic transaction and systems and methods for encrypting data relating to executed electronic transactions.

BACKGROUND OF THE INVENTION

Advancements in quantum computing present a critical threat to electronic transaction systems including blockchain based systems. Within the next 10 years, advances in data processing speed and quantum computing could enable the cryptographic keys used for the algorithms that keep electronic transactions safe could be reliably cracked or solved. Furthermore, government regulations and/or the current lack thereof, present a secondary threat to widespread adoption of blockchain and cryptocurrency based electronic transactions. Specifically, because regulators regard such transactions as ripe for fraud and financial abuse they have adopted a platform of trying to rein in the use of such transactions.

In light of these defects, systems and methods capable of better data encryption and user verification than presently available are needed.

BRIEF DESCRIPTION OF THE DRAWINGS

For a better understanding of the various embodiments of the present invention, reference may be made to the accompanying drawings in which.

Figure 1:
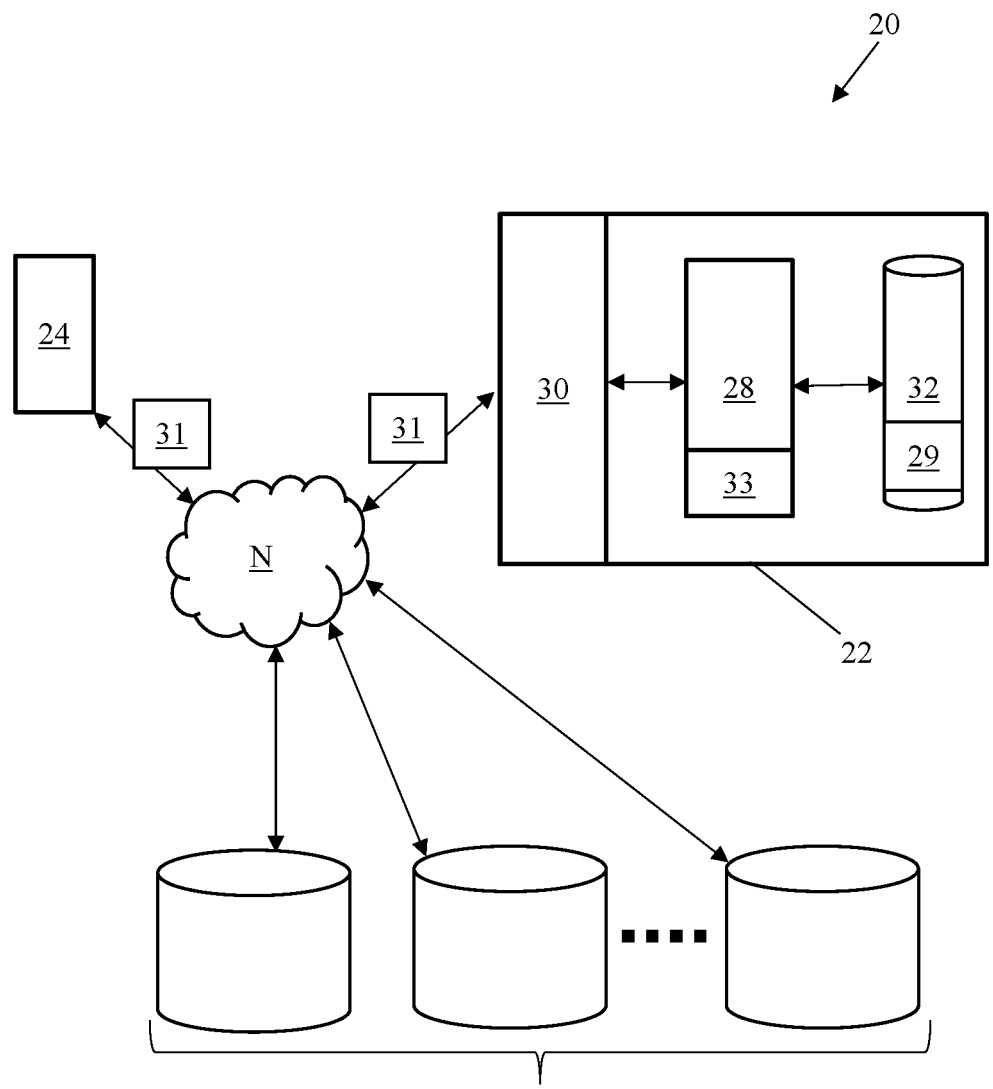
FIG. 1 is block diagram of a system according to disclosed embodiments.

While the disclosure is susceptible to various modifications and alternative forms, specific embodiments thereof are shown by way of example in the drawings and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE DRAWINGS

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

FIG. 1 is block diagram of a user authentication and data encryption system 20 according to disclosed embodiments. As seen in FIG. 1 in some embodiments, the user authentication and data encryption system 20 can include a server 22, a remote user device 24, and a plurality of remote databases 26. In some embodiments, the server 22 can include a programmable processor 28 that is electrically coupled to a communication interface 30 and a data storage device 32. In some embodiments, the data storage device 32 can include a data base or electronic memory that stores verified data 29.

In some embodiments, the communication interface 30 can connect the programmable processor 28 to the remote user device 24 and the plurality of remote databases 26 through a network N. For example, in some embodiments, the programmable processor 28 can be configured to receive an electronic request signal 31 to initiate processing of a secured electronic transaction relating to a first user account from the remote user device 24 via the network N and the communication interface 30. Various embodiments for the network N are contemplated. Such embodiments can include, but are not limited to, a local area network (LAN), a wide area network (WAN) such as the internet or the like, a cellular data network, and other communication networks known in the art. In some embodiments, the communication interface 30 can employ an application programing interface (API) such as a web based API to connect the programmable processor 28 to the remote user device 24 as well as other user devices.

Figure 2:
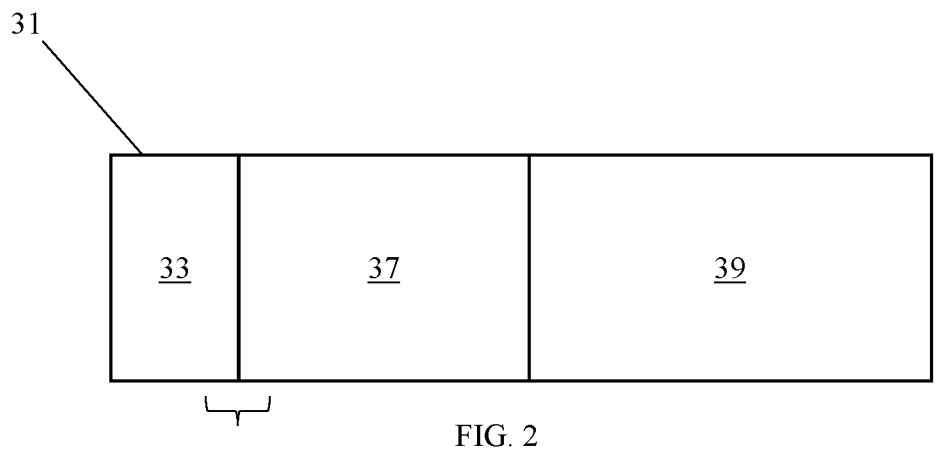
FIG. 2 is a block diagram of the contents of an electric request signal according to disclosed embodiments.

FIG. 2 is a block diagram of the contents of the electronic request signal 31 according to disclosed embodiments. As seen in FIG. 2 in some embodiments, the electronic request signal 31 can include verification metadata 33 for use in verifying the authenticity of the electronic request signal 31; a digital image 37 for use in verifying the authenticity of the electronic request signal 31 and/or encrypting transaction data generated by executing the secured electronic transaction; and transaction processing data 39 used to execute the secured electronic transaction. In some embodiments, the verification metadata 33 and the digital image 37 or identifying features extracted from the digital image 37 can comprise verification data 35 as described herein.

Referring again to FIG. 1, in some embodiments, the programmable processor 28 can include a digital image processing module 33 configured to extract identifying features from a digital image input thereto such as the digital image 37 included with the electronic request signal 31. In some embodiments, the digital image processing module 33 can include one or both of a object recognition module configured to recognize objects present in a digital image processed by the digital image processing module 33 and a background recognition module configured to recognize background features present in a digital image processed by the digital image processing module 33. In some embodiments, the object recognition module can include a facial recognition module configured to recognize human faces.

Figure 3:
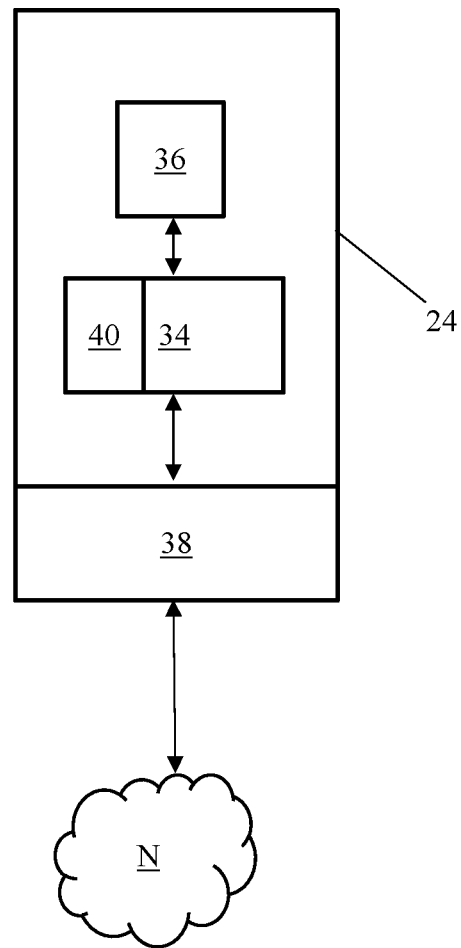
FIG. 3 is a block diagram of a user device according to disclosed embodiments.

FIG. 3 is a bock diagram of the remote user device 24 according to disclosed embodiments. As seen in FIG. 3, in some embodiments, the remote user device 24 can include a programmable processor 34 that can be electrically coupled to an image capturing device 36 and a communication interface 38. In some embodiments, the communication interface 38 can connect the programmable processor 34 to the server 22 and the plurality of remote databases 26 through the network N.

In some embodiments, the programmable processor 34 like the programmable processor 28, can include a digital image processing module 40 that is similar to the digital image processing module 33 and is configured to extract identifying features from a digital image input thereto. In some embodiments, the image capturing device 26 can capture the digital image 37, which can be processed through the digital image processing module 40 and/or transmitted to the server 22 for processing by the programmable processor 28 and the digital image processing module 33. In some embodiments, the digital image processing module 40 can include one or both of a object recognition module configured to recognize objects present in a digital image processed by the digital image processing module 40 and a background recognition module configured to recognize background features present in a digital image processed by the digital image processing module 40. In some embodiments, the object recognition module can include a facial recognition module configured to recognize human faces.

It is to be understood that the server 22 and the remote user device 24 as disclosed herein can further include a respective memory device, which can be in communication with control circuitry, one or more programmable processors such as the programmable processors 28 and 34, and executable control software as would be understood by one of ordinary skill in the art. In some embodiments, the control software can be stored on a transitory or non-transitory computer readable medium, including, but not limited to local computer memory, RAM, optical storage media, magnetic storage media, flash memory, and the like, and some or all of the control circuitry, the programmable processors, and the control software can execute and control at least some of the methods described herein.

Figure 4:
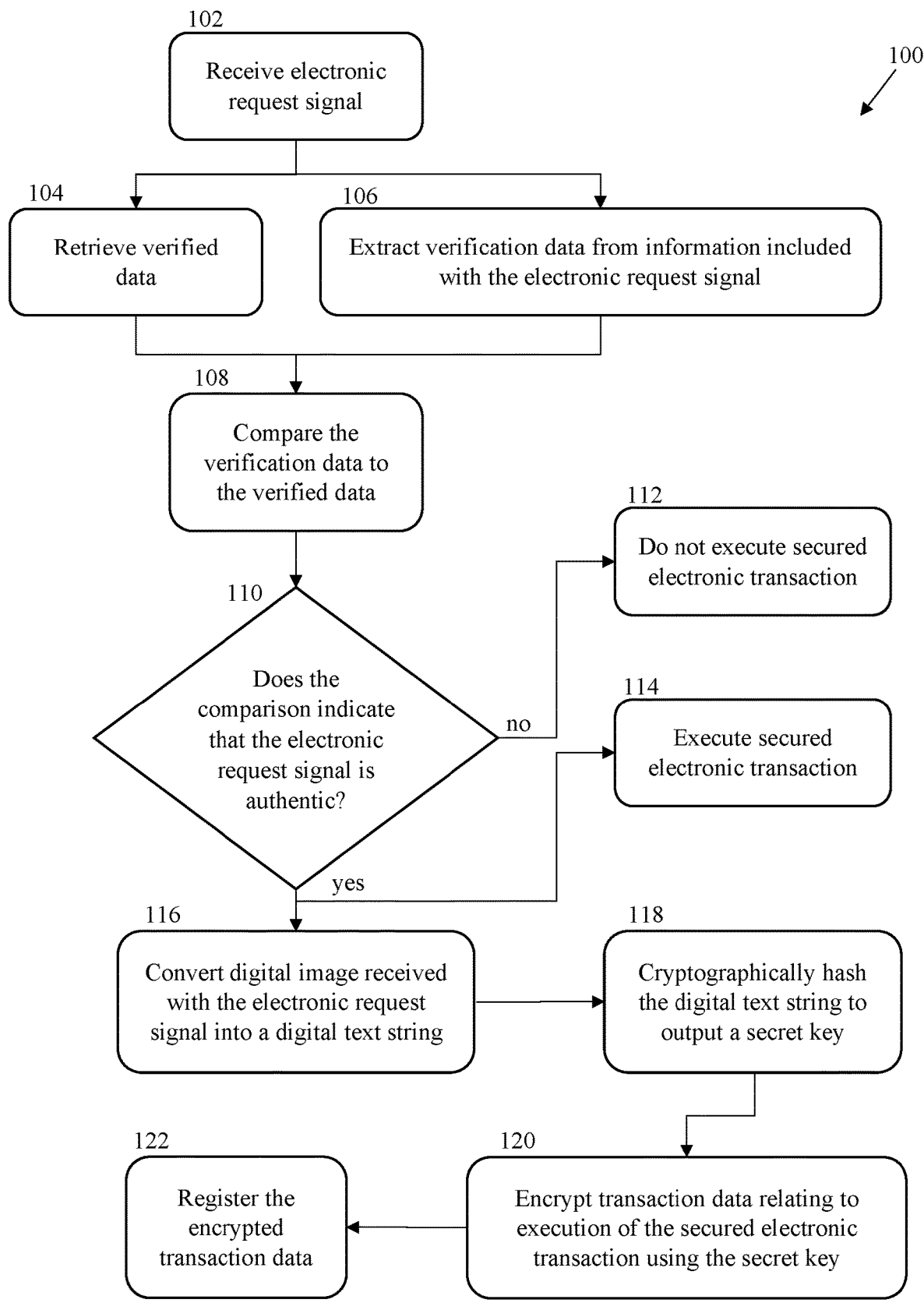
FIG. 4 is a flow diagram of a method according to disclosed embodiments.

FIG. 4 is a flow diagram of a method 100 for authenticating the electronic request signal 31 and encrypting transaction data according to disclosed embodiments. As seen in FIG. 4, in some embodiments the method 100 can include receiving the electronic request signal 31 to initiate processing of a secured electronic transaction relating to a first user account, as in 102. In some embodiments, the electronic request signal 31 can be received by the programmable processor 28 via the communication interface 30. For example, in some embodiments, the electronic request signal 31 can be included in a transmission from the remote user device 24 sent over the network N via the communication interface 38.

After the electronic request signal 31 is received, the method 100 can include the programmable processor 28 retrieving the verified data 29 associated with the first user account from the data storage device 32 and extracting the verification data 35 from information included with the electronic request signal 31, as in 104 and 106. Next, the method 100 can include the programmable processor 28 comparing the verification data 35 against the verified data 29 and determining whether the comparison indicates that the electronic request signal 31 is authentic or fraudulent, as in 108 and 110. When the programmable processor 28 determines that the electronic request signal 31 is fraudulent, the method 100 can include failing to execute the secured electronic transaction, as in 112.

However, when the programmable processor 28 determines that the electronic request signal 31 is authentic, the method 100 can include executing the secured electronic transaction, as in 114. For example, in some embodiments the programmable processor 28 can execute the secured electronic transaction using the transaction processing data 39. The transaction processing data 39 can include various information as would be understood by those of ordinary skill in the art. For example, in embodiments where the secured electronic transaction involves the electronic exchange of digital currency or digital goods, the transaction processing data 39 can include a transfer amount documenting how much of the digital currency or goods should be transferred and an account descriptor. In some embodiments, the account descriptor documents a second user account to which the first user account linked to the electronic request signal 31 should transfer the transfer amount of the digital currency or goods. Additionally or alternatively, in some embodiments, the account descriptor documents an account to which the first user account linked to the electronic request signal 31 should solicit the transfer amount of the digital currency or goods. In some embodiments, the transaction processing data 39 can also include a list of all user accounts needed to complete the secured electronic transaction, verification that all of the user accounts, including any 3rd party user accounts separate from the first user account, have permission to access the user authentication and data encryption system 20, and a transaction location or locations designated by the listed user accounts for storing data output from the method 100 such as transaction data relating to execution of the secured electronic transaction or encrypted versions thereof as discussed below. In some embodiments the transaction data can include a listing of a number of items exchanged and the user accounts between which the items where exchanged. As would be understood by persons having ordinary skill in the art, the first user account and other 3rd party user accounts can be associated with various entities such as individual persons, corporations, business, etc.

Furthermore, in some embodiments, when the programmable processor 28 determines that the electronic request signal 31 is authentic, the method 100 can include the programmable processor 28 converting the digital image 37 received with the electronic request signal 31 into a digital text string, as in 116. In some embodiments, the programmable processor 28 can convert the digital image 37 into the digital text string by converting binary data which comprises the digital image 37 into a Base64 digital text string. In some embodiments, the Base64 or other conversion data for the digital image 37 can be structurally combined with other user metadata such as the verification metadata 33 to form the digital text string.

After converting the digital image 37 into the digital text string, the method 100 can include the programmable processor 28 cryptographically hashing the digital text string to output a secret key and digitally encrypting the transaction data relating to execution of the secured electronic transaction using the secret key, as in 118 and 120. In some embodiments, the secret key can be stored in the data storage device 32 and associated with the first user account for the remote user device 24 so that it can be remotely recalled by the remote user device 24 at a later time. Additionally or alternatively, in some embodiments, the secret key can be transmitted to the remote user device 24 and stored locally thereon such as in a general or encrypted memory device.

Various encryption protocols known in the art are contemplated to digitally encrypt the transaction data. Such encryption protocols include, but are not limited to, various forms of the Advanced Encryption Standard (AES) including one or more Cipher Block Chaining (CBC) and/or Galois/Counter Mode (GCM) variants such as AES-256-CBC, AES-256-GCM, AES-512-CBC, and AES-512-GCM. In some embodiments, both CBC and GCM can be used to increase the difficulty in deciphering the encrypted transaction data. In some embodiments, and initialization vector used in connection with one of the encryption protocols described herein can be supplied by the programmable processor 28.

Finally, the method 100 can include the programmable processor 28 registering the transaction data as encrypted with one or more of the plurality of remote databases 26, as in 122. In some embodiments, the plurality of remote databases 26 can include one or more public blockchains. In some embodiments, registering the transaction data as encrypted can include dividing the transaction data as encrypted into a plurality of segments and then registering each of the plurality of segments at a different one of the public blockchains. In some embodiments, the plurality of remote databases 28 can be included in the transaction location or locations included with the transaction processing data 39. Various embodiments for the public blockchains are contemplated, including existing block chain systems and forks of such systems. Furthermore, in some embodiments, the user authentication and data encryption system 20 can be configured to interoperate with multiple block chain systems and protocols. For example, in some embodiments the user authentication and data encryption system 20 can bridge one ore more different block chains as would be understood by those having ordinary skill in the art.

Various embodiments for determining whether the electronic request signal 31 is authentic or fraudulent are contemplated. For example, extracting the verification data 35 from the information included with the electronic request signal 31, can include directly extracting and or generating one or more different types of data such as the identifying features extracted from the digital image 37 and/or the verification metadata 33 received with the electronic request signal 31. In these embodiments, the verified data 29 can include data types that are correlated with the different types of verification data 35.

For example, in embodiments where the information included with the electronic request signal 31 includes the digital image 37 and the verification data 35 includes the identifying features extracted from the digital image 37, the method 100 can include the programmable processor 28 inputting the digital image 37 to the digital image processing module 33 to extract the identifying features from the digital image 37. For example, in embodiments where the digital image processing module 33 includes the object recognition module, the method 100 can include the programmable processor 28 using the object recognition module to extract data representing a verification object as the identifying features. Similarly, in embodiments where the digital image processing module 33 includes the background recognition module, the method 100 can include the programmable processor 28 using the background recognition module to extract data representing verification background features as the identifying features. Additionally or alternatively, in embodiments where the object recognition module includes a facial recognition module, the verification object can include a verification human face.

In some embodiments, the digital image processing module 33 can extract the identifying features from the digital image 37 using an object detection and localization process. In these embodiments, the digital image processing module 33 can employ a convolutional neural network (CNN) to classify different identified regions of the digital image 37 using linear support vector machines (SVMs). In some embodiments, the digital image processing module 33 can output the identifying features as a plurality of bounding boxes with a respective class label that can then be compared against the verified data 29 to determine whether the electronic request signal 31 is authentic or fraudulent. Furthermore, in some embodiments, Regional based Convolutional Neural Networks (RCNNs) can be employed to detect and localize the verification objects and verification background features within the digital image 37. In these embodiments, a two step process of selective search and CNN classification can be employed. First, the digital image 37 is searched to identify and bound with bounding boxes regions of the digital image 37 that contain the verification object and/or the verification background features. Second, each bounding box is classified CNN to produce the identifying features which can then be compared against the verified data 29 to determine whether the electronic request signal 31 is authentic or fraudulent.

Furthermore, in embodiments where the verification data 35 includes the data representing the verification object and/or the data representing the verification background features, the verified data 29 stored in the data storage device 32 can include data representing one or more verified objects and/or data representing one or more verified background features. In these embodiments, the method 100 can include the programmable processor 28 comparing the data representing the verification object to the data representing the one or more verified objects and comparing the data representing the verification background features to the data representing the one or more verified background features. In these embodiments, the method 100 can include the programmable processor 28 determining that the electronic request signal 31 is authentic when the data representing the verification object matches a preconfigured percentage of the data representing the one or more verified objects and/or when the data representing the verification background features matches a preconfigured percentage of the data representing the one or more verified background features. Likewise, the method 100 can include the programmable processor 28 determining that the electronic request signal 31 is fraudulent when the data representing the verification object fails to match the preconfigured percentage of the data representing the one or more verified objects and/or when the data representing the verification background features fails to match the preconfigured percentage of the data representing the one or more verified background features.

Using the verification and verified background features to assess the authenticity of the electronic request signal can help to prevent situations where a nefarious actor attempts to submit a fraudulent electronic request signal and use a photo image to attempt to fool the object recognition comparison. Using the verification and verified background features in the manner described herein can prevent such attempts from being successful because it is unlikely that all of the background features captured in the digital image 37 would match the background features of the typical surroundings of an authorized user. Furthermore, in some embodiments, the using the verification and verified background features in the manner described herein can detect instances where a photo image is being held up to the image capturing device 36.

Various embodiments for generating the data representing one or more verified objects and/or the data representing one or more verified background features are contemplated. For example, in some embodiments, the programmable processor 28 can generate the data representing one or more verified objects and the one or more verified background features by processing one or more verified digital images respectively through the object and background recognition modules of the digital image processing module 33. In some embodiments, the one or more verified digital images can be verified as coming from an authorized user of the first user account before being used to generate the data representing one or more verified objects and the one or more verified background features.

Additionally or alternatively, in some embodiments, the verification data 35 can include the verification metadata 33 received with the electronic request signal 31. In these embodiments, the verified data 29 can include verified metadata stored in the data storage device 32 and the method 100 can include the programmable processor 28 comparing the verification metadata 33 to the verified metadata. Then, the method 100 can include the programmable processor 28 determining that the electronic request signal 31 is authentic when the verification metadata 33 matches a preconfigured amount of verified metadata and determining that the electronic request signal 31 is fraudulent when the verification metadata 33 fails to match the preconfigured amount of verified metadata.

In some embodiments, the method 100 can include the programmable processor 28 determining whether the electronic request signal 31 is authentic or fraudulent using the verification metadata 33 and the data representing the verification object and/or data representing the verification background features. In these embodiments, the method 100 can include the programmable processor 28 determining that the electronic request signal 31 is authentic when the verification metadata 33 matches the preconfigured amount of verified metadata, the data representing the verification object matches the preconfigured percentage of data representing a verified object, and the data representing the verification background features matches the preconfigured percentage of data representing verified background features. Furthermore, the method 100 can include the programmable processor 28 determining that the electronic request signal 31 is fraudulent when one or more of the verification metadata 33 fails to match the preconfigured amount of verified metadata, the data representing the verification object fails to match the preconfigured percentage of data representing the verified object, and the data representing the verification background features fails to match a second preconfigured percentage of data representing verified background features.

Various embodiments for the verification metadata 33 and verified metadata are contemplated. For example, in some embodiments, the verified metadata can include one or more of IP addresses, geolocation information, and other device information for authorized user devices such as phones, tablets, computers, etc. associated with the first user account. Furthermore, the verified metadata can include user account information such as a phone number, a username, an email address, a username, a unique user identifier, user device authentication credentials, and/or other similar information. In such embodiments, the verification metadata 33 can likewise include one or more of an IP address, geolocation information other device information, a phone number, a username, an email address, a username, a unique user identifier, user device authentication credentials generated from unlocking the remote user device 24, other similar user account information, and the like which the programmable processor 28 can compare with a corresponding item of the verified metadata when determining whether the electronic request signal 31 is authentic or fraudulent. In some embodiments, the verification metadata 33 can be embedded in electronic request signal 31.

In some embodiments, one or more of the items of verified metadata can be requested by the programmable processer 28 after the verification metadata 33 is received. For example, in some embodiments, the method 100 can include the programmable processor 28 using stored communication information in the data storage device 32 to solicit a current IP address and/or geo-location information for one or more of the authorized user devices after receiving the verification metadata 33. The programmable processor 28 can then determine that remote user device 24 that sent the electronic request signal 31 was either one of the authorized user devices by matching the IP address and/or was proximate to one of the authorized user devices by matching the geo-location information included in the verification information to the solicited current IP address and/or geo-location information, respectively.

In some embodiments, an artificial impenitence (AI) based process can be substituted for at least steps 108 and 110 of the method 100 and can be used to indicate whether the electronic request signal 31 is authentic or fraudulent. For example, in these embodiments, the method 100 can include the programmable processor 28 feeding the user verification information, in one of the various forms described herein, into a previously trained AI model recalled form the data storage device 32. In some embodiments the AI model can output an indication of whether the electronic request signal 31 is authentic or fraudulent to the programmable processor 28. From there, the programmable processor can parse the output indication to perform the remaining steps of the method 100 as described herein. In some embodiments, the AI model can be previously trained by an iterative learning process known in the art that uses the verified data in one or more of the various forms described herein as training data.

Figure 5A:
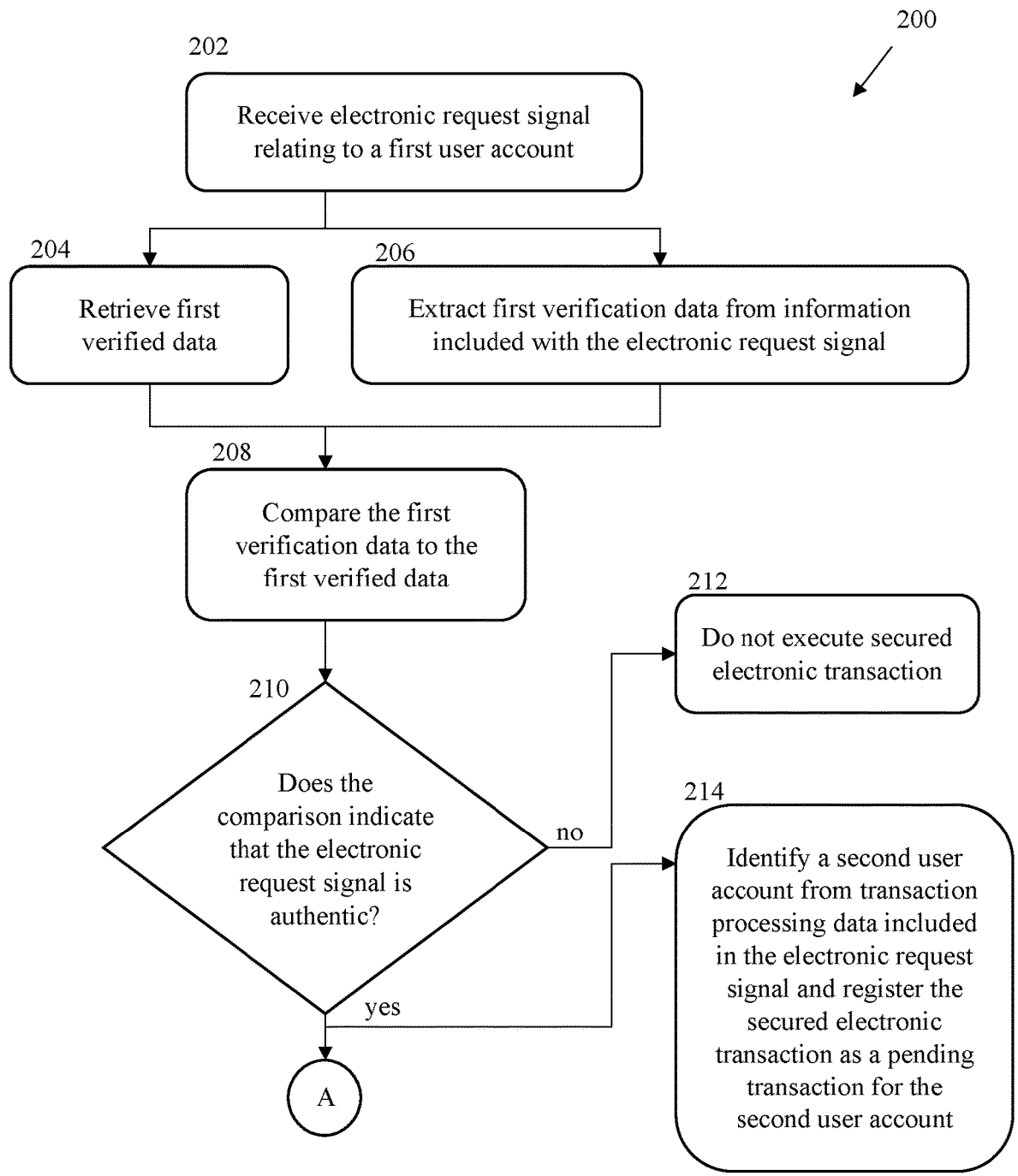
FIGS. 5A and 5B are a flow diagram of a method according to disclosed embodiments.
Figure 5B:
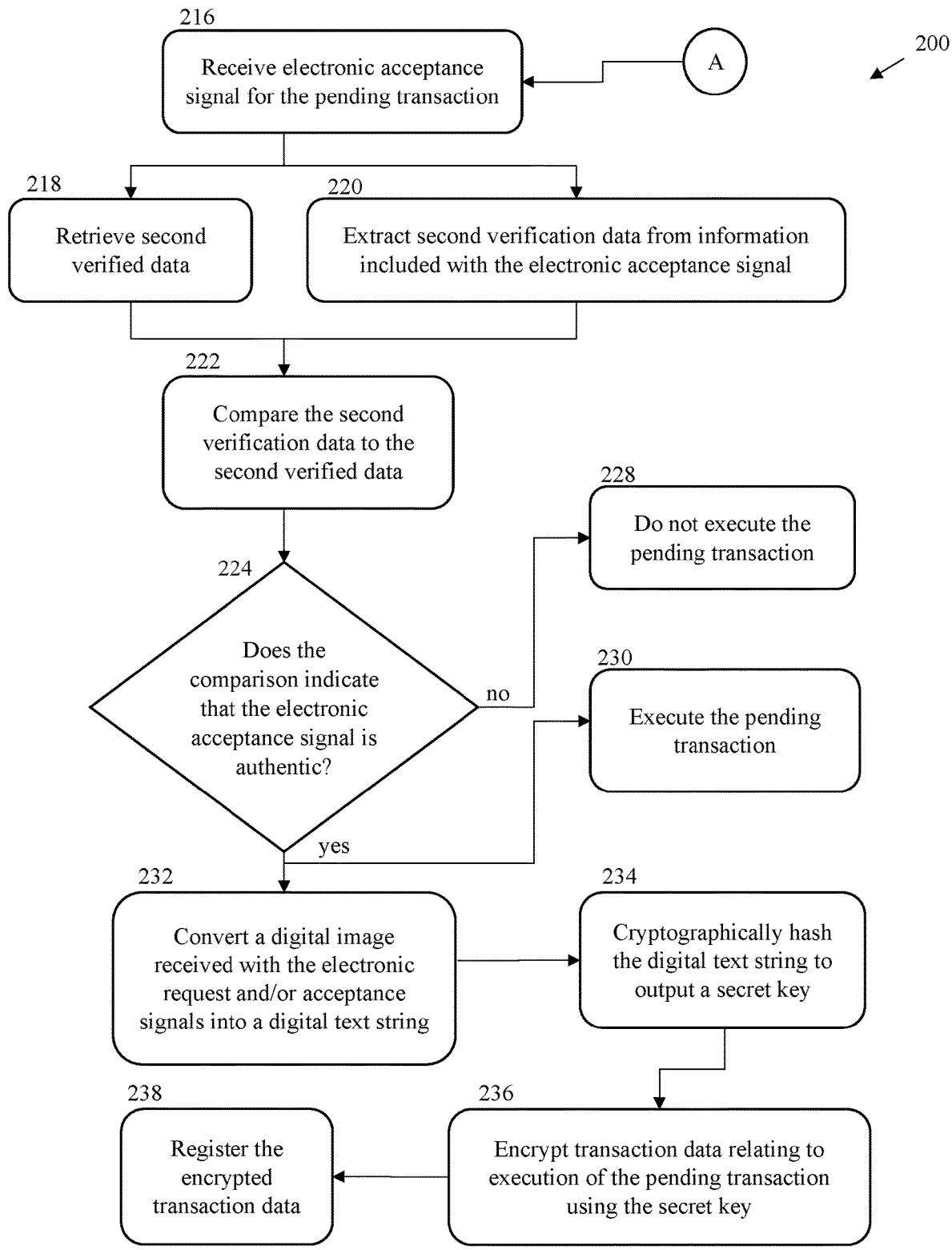

FIGS. 5A and 5B are flow diagram of a method 200 according to disclosed embodiments. In some embodiments, the method 200 can be similar to the method 100 except that the secured electronic transaction is first registered as a pending transaction for a second user account and that the pending transaction is executed when an electronic acceptance signal for the pending transaction is received and determined to be authentic. For example, in some embodiments the method 200 can include receiving the electronic request signal 31 to initiate processing of a secured electronic transaction relating to a first user account, as in 202. Then, the method 200 can include the programmable processor 28 retrieving the first verified data 29 associated with the first user account from the data storage device 32 and extracting the first verification data 35 from information included with the electronic request signal 31, as in 204 and 206. Next, the method 200 can include the programmable processor 28 comparing the first verification data 35 against the first verified data 29 and determining whether the comparison indicates that the electronic request signal 31 is authentic or fraudulent, as in 208 and 210. When the programmable processor 28 determines that the electronic request signal 31 is fraudulent, the method 200 can include failing to execute the secured electronic transaction, as in 212. However, when the programmable processor 28 determines that the electronic request signal 31 is authentic, the method 200 can include identifying a second user account from the transaction processing data 39 included in the electronic request signal and registering the secured electronic transaction as a pending transaction for the second user account, as in 214. In some embodiments, the method 200 can include transmitting a notification to a remote user device associated with the second user account that the pending transaction has been registered.

After the pending transaction has been registered, the method 200 can include receiving an electronic acceptance signal for the pending transaction, as in 216. Then, the method 200 can include the programmable processor 28 retrieving the second verified data associated with the second user account from the data storage device 32 and extracting the second verification data from information included with the electronic acceptance signal, as in 218 and 220. Next, the method 200 can include the programmable processor 28 comparing the second verification data against the second verified data and determining whether the comparison indicates that the electronic acceptance signal is authentic or fraudulent, as in 222 and 224. When the programmable processor 28 determines that the electronic acceptance signal is fraudulent, the method 200 can include failing to execute the pending transaction, as in 228. However, when the programmable processor 28 determines that the electronic acceptance signal is authentic, the method 200 can include executing the pending transaction as in 230. In some embodiments, the electronic acceptance signal can be in a format similar to the electronic request signal 31 such that verifying whether the electronic acceptance signal is authentic is accomplished in a manner similar to that described with respect to steps 104-110 of method 100 described herein.

Furthermore, in some embodiments, when the programmable processor 28 determines that the electronic acceptance signal is authentic, the method 200 can include the programmable processor 28 converting one or both of the digital image 37 received with the electronic request signal 31 or a second digital image received with the electronic acceptance signal into a single text string or different respective digital text strings using one or more of the process described herein, as in 232. In some embodiments, the conversion data for the digital image 37 and/or the second digital image can be structurally combined with other user metadata such as the verification metadata 33 and second verification metadata including in the electronic acceptance signal to form the single digital text string and/or the different respective digital text strings. After generating single text string or different respective digital text strings, the method 200 can include the programmable processor 28 cryptographically hashing single text string or different respective digital text strings to output a single secret key or different respective digital keys and digitally encrypting the transaction data relating to execution of the pending transaction using single secret key or different respective digital keys, as in 234 and 236. Finally, the method 200 can include the programmable processor 28 registering the transaction data as encrypted with one or more of the plurality of remote databases 26 in the manner described herein, as in 238.

In some embodiments where the single text string and the single secret key are generated, the method 200 can include combining together converted binary data from the digital image 37 and the second digital image to generate the single digital text string and then cryptographically hashing the combined data to generate the single secret key. Additionally or alternatively in some embodiments where the single text string and the single secret key are generated, the single text string and the single secret key can be generated from the digital image (e.g. the digital image 37 or the second digital image) that is associated with the user account that the programmable processor 28 identifies as a sender of items documented in the electronic request signal 31 (e.g. digital currency, digital goods, etc.).

Furthermore, in embodiments where the different respective text strings and the different respective secret keys are generated, the method 200 can include digitally encrypting the transaction data relating to execution of the pending transaction twice: once using the respective secret key generated from the digital image 37 and a second time using the respective secret key generated from the second digital image. Then, the method 200 can include the programmable processor 28 registering one or both instances of the transaction data as encrypted with one or more of the plurality of remote databases 26. In these embodiments, the user authentication and data encryption system 20 is able to maintain separate encrypted transaction records for both the sender and receiver of items documented in the electronic request signal 31 (e.g. digital currency, digital goods, etc.).

In some embodiments, some or all of the steps of the methods 100 and 200 performed by components of the server 22 can be performed on the remote user device 24 and or other remote user device such as would be understood by those of ordinary skill in the art. For example, in these embodiments, the programmable processor 34 can perform some or all of steps described as being performed by the programmable processor 28 and the digital image processing module 40 can perform some or all of the steps described as being performed by the digital image processing module 33. Furthermore, in some embodiments, the data storage device 32 can be embedded in the remote user device 24 and/or connected to the remote user device 24 via the network N.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A method comprising:
   receiving an electronic request signal to initiate processing of a secured electronic transaction relating to a user account;
   retrieving verified data associated with the user account from a digital data storage device;
   extracting verification data from information included with the electronic request signal;
   comparing the verification data against the verified data to determine whether the electronic request signal is authentic or fraudulent,
   when the electronic request signal is determined as authentic, executing the secured electronic transaction and converting a digital image received with the electronic request signal into a digital text string;
   cryptographically hashing the digital text string to output a secret key;

digitally encrypting transaction data relating to the secured electronic transaction using the secret key; and registering the transaction data as encrypted with one or more databases.

2. The method of claim 1 further comprising:

inputting the digital image to a digital image processing module to extract identifying features from the digital image, wherein the information included with the electronic request signal includes the digital image and the verification data includes the identifying features extracted from the digital image;

extracting data representing a verification object as the identifying features using an object recognition module which comprises the digital image processing module;

determining that the electronic request signal is authentic when the data representing the verification object matches a preconfigured percentage of data representing a verified object, wherein the verified data includes the data representing the verified object; and determining that the electronic request signal is fraudulent when the data representing the verification object fails to match the preconfigured percentage of the data representing the verified object.

3. The method of claim 1 further comprising:

inputting the digital image to a digital image processing module to extract identifying features from the digital image, wherein the information included with the electronic request signal includes the digital image and the verification data includes the identifying features extracted from the digital image;

extracting data representing verification background features as the identifying features using a background recognition module which comprises the digital image processing module;

determining that the electronic request signal is authentic when the data representing the verification background features matches a preconfigured percentage of data representing verified background features, wherein the verified data includes the data representing the verified background features; and determining that the electronic request signal is fraudulent when the data representing the verification background features fails to match the preconfigured percentage of the data representing the verified background features.

4. The method of claim 1 further comprising:

inputting the digital image to a digital image processing module to extract identifying features from the digital image, wherein the information included with the electronic request signal includes the digital image and the verification data includes the identifying features extracted from the digital image;

extracting data representing a verification object as a first portion of the identifying features using an object recognition module included in the digital image processing module;

extracting data representing verification background features as a second portion of the identifying features using a background recognition module included in the digital image processing module;

determining that the electronic request signal is authentic when both the data representing the verification object matches a first preconfigured percentage of data representing a verified object and the data representing the verification background features matches a second preconfigured percentage of data representing verified background features, wherein the verified data includes the data representing the verified object and the data representing the verified background features; and determining that the electronic request signal is fraudulent when one or both of the data representing the verification object fails to match a first preconfigured percentage of data representing a verified object and the data representing the verification background features fails to match a second preconfigured percentage of data representing verified background features.

5. The method of claim 1 further comprising:

receiving verification metadata with the electronic request signal as the information included with the electronic request signal;

determining that the electronic request signal is authentic when the verification metadata matches a preconfigured amount of verified metadata, wherein the verified data includes the verified metadata; and determining that the electronic request signal is fraudulent when the verification metadata fails to match the preconfigured amount of verified metadata.

6. The method of claim 1 further comprising:

receiving verification metadata with the electronic request signal;

inputting the digital image to a digital image processing module to extract identifying features from the digital image, wherein the information included with the electronic request signal includes the digital image and the verification metadata and the verification data includes the identifying features extracted from the digital image and the verification metadata;

extracting data representing a verification object as a first portion of the identifying features using an object recognition module included in the digital image processing module;

extracting data representing verification background features as a second portion of the identifying features using a background recognition module included in the digital image processing module;

determining that the electronic request signal is authentic when the verification metadata matches a preconfigured amount of verified metadata, the data representing the verification object matches a first preconfigured percentage of data representing a verified object, and the data representing the verification background features matches a second preconfigured percentage of data representing verified background features, wherein the verified data includes the data representing the verified object and the data representing the verified background features; and determining that the electronic request signal is fraudulent when one or more of the verification metadata fails to match the preconfigured amount of verified metadata, the data representing the verification object fails to match the first preconfigured percentage of data representing the verified object, and the data representing the verification background features fails to match the second preconfigured percentage of data representing verified background features.

7. The method of claim 1 wherein an encryption protocol used to digitally encrypting the transaction data relating to the secured electronic transaction using the secret key includes one of AES-256-CBC, AES-256-GCM, AES-512-CBC, and AES-512-GCM.

8. The method of claim 1 wherein the one or more databases include one or more public blockchains, wherein registering the transaction data as encrypted includes dividing transaction data as encrypted into a plurality of segments and the registering each of the plurality of segments at a different one of the one or more public blockchains.

9. A method comprising:
receiving an electronic request signal to initiate processing of a secured electronic transaction relating to a first user account;
retrieving first verified data associated with the first user account from a digital data storage device;
extracting first verification data from information included with the electronic request signal;
comparing the first verification data against the first verified data to determine whether the electronic request signal is authentic or fraudulent;
when the electronic request signal is determined as authentic, identifying a second user account from transaction processing data included in the electronic request signal and registering the secured electronic transaction as a pending transaction for the second user account;
receiving an electronic acceptance signal for the pending transaction;
retrieving second verified data associated with the second user account from a digital data storage device;
extracting second verification data from information included with the electronic acceptance signal;
comparing the second verification data against the second verified data to determine whether the electronic acceptance signal is authentic or fraudulent,
when the electronic acceptance signal is determined as authentic, executing the pending transaction and converting a digital image into a digital text string, wherein the digital image is received with one of the electronic request signal and the electronic acceptance signal;
cryptographically hashing the digital text string to output a secret key;
digitally encrypting transaction data relating to execution of the pending transaction using the secret key; and
registering the transaction data as encrypted with one or more databases.

10. A system comprising:
a programmable processor;
a communication interface electrically coupled to the programmable processor; and
a digital data storage device that stores verified data associated with a user account;
wherein the programmable processor:
receives an electronic request signal to initiate processing of a secured electronic transaction relating to the user account;
retrieves the verified data associated with the user account from a digital data storage device;
extracts verification data from information included with the electronic request signal;
compares the verification data against the verified data to determine whether the electronic request signal is authentic or fraudulent;
when the electronic request signal is determined as authentic, initiate the secured electronic transaction and convert a digital image received with the electronic request signal into a digital text string;
cryptographically hash the digital text string to output a secret key;
digitally encrypt transaction data relating to the secured electronic transaction using the secret key; and
register the transaction data as encrypted with one or more databases via the communication interface.

11. The system of claim 10 wherein the programmable processor:
inputs the digital image to a digital image processing module to extract identifying features from the digital image, wherein the information included with the electronic request signal includes the digital image and the verification data includes the identifying features extracted from the digital image;
extracts data representing a verification object as the identifying features using a object recognition module which comprises the digital image processing module;
determines that the electronic request signal is authentic when the data representing the verification object matches a preconfigured percentage of data representing a verified object, wherein the verified data includes the data representing the verified object; and
determines that the electronic request signal is fraudulent when the data representing the verification object fails to match the preconfigured percentage of the data representing the verified object.

12. The system of claim 10 wherein the programmable processor:
inputs the digital image to a digital image processing module to extract identifying features from the digital image, wherein the information included with the electronic request signal includes the digital image and the verification data includes the identifying features extracted from the digital image;
extracts data representing verification background features as the identifying features using a background recognition module which comprises the digital image processing module;
determines that the electronic request signal is authentic when the data representing the verification background features matches a preconfigured percentage of data representing verified background features, wherein the verified data includes the data representing the verified background features; and
determines that the electronic request signal is fraudulent when the data representing the verification background features fails to match the preconfigured percentage of the data representing the verified background features.

13. The system of claim 10 wherein the programmable processor:
inputting the digital image to a digital image processing module to extract identifying features from the digital image,
wherein the information included with the electronic request signal includes the digital image and the verification data includes the identifying features extracted from the digital image,
extracting data representing a verification object as a first portion of the identifying features using an object recognition module included in the digital image processing module;
extracting data representing verification background features as a second portion of the identifying features using a background recognition module included in the digital image processing module;
determining that the electronic request signal is authentic when both the data representing the verification object matches a first preconfigured percentage of data representing a verified object and the data representing the verification background features matches a second preconfigured percentage of data representing verified background features, wherein the verified data includes the data representing the verified object and the data representing the verified background features; and determining that the electronic request signal is fraudulent when one or both of the data representing the verification object fails to match a first preconfigured percentage of the data representing the verified object and the data representing the verification background features fails to match the second preconfigured percentage of the data representing the verified background features.

14. The system of claim 10 wherein the programmable processor:

receiving verification metadata with the electronic request signal as the information included with the electronic request signal;

determining that the electronic request signal is authentic when the verification metadata matches a preconfigured amount of verified metadata, wherein the verified data includes the verified metadata; and determining that the electronic request signal is fraudulent when the verification metadata fails to match the preconfigured amount of verified metadata.

15. The system of claim 10 wherein the programmable processor:

receives verification metadata with the electronic request signal;

inputs the digital image to a digital image processing module to extract identifying features from the digital image, wherein the information included with the electronic request signal includes the digital image and the verification metadata and the verification data includes the identifying features extracted from the digital image and the verification metadata;

extracts data representing a verification object as a first portion of the identifying features using an object recognition module included in the digital image processing module;

extracts data representing verification background features as a second portion of the identifying features using a background recognition module included in the digital image processing module;

determines that the electronic request signal is authentic when the verification metadata matches a preconfigured amount of verified metadata and each the data representing the verification object matches a first preconfigured percentage of data representing a verified object and the data representing the verification background features matches a second preconfigured percentage of data representing verified background features, wherein the verified data includes the data representing the verified object and the data representing the verified background features; and determines that the electronic request signal is fraudulent when one or more of the verification metadata fails to match the preconfigured amount of verified metadata, the data representing the verification object fails to match the first preconfigured percentage of data representing the verified object, and the data representing the verification background features fails to match the second preconfigured percentage of data representing the verified background features.

16. The system of claim 10 further comprising:

a user interface electrically coupled to the programmable processor that responsive to user input sends the electronic request signal and the information included therewith to the programmable processor; and a digital camera electrically coupled to the programmable processor that captures and sends the digital image to the programmable processor.

17. The system of claim 10 wherein the programmable processor:

receives the electronic request signal, the digital image, and the information included with the electronic request signal from a remote user device via the communication interface.

18. The system of claim 10 wherein converting the digital image into the digital text string includes converting binary data which comprises the digital image into a Base64 digital text string.

19. The system of claim 10 wherein an encryption protocol used to digitally encrypt the transaction data relating to the secured electronic transaction using the secret key includes one of AES-256-CBC, AES-256-GCM, AES-512-CBC, and AES-512-GCM.

20. The system of claim 10 wherein the one or more databases include one or more public blockchains, wherein registering the transaction data as encrypted includes dividing transaction data as encrypted into a plurality of segments and the registering each of the plurality of segments at a different one of the one or more public blockchains.

* * * * *